United States Patent
Morishima et al.

(10) Patent No.: US 10,670,814 B2
(45) Date of Patent: Jun. 2, 2020

(54) OPTICAL CONNECTOR AND OPTICAL CONNECTION STRUCTURE

(71) Applicant: SUMITOMO ELECTRIC INDUSTRIES, LTD., Osaka-shi, Osaka (JP)

(72) Inventors: Tetsu Morishima, Osaka (JP); Tetsuya Nakanishi, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 16/149,343

(22) Filed: Oct. 2, 2018

(65) Prior Publication Data

US 2019/0101704 A1    Apr. 4, 2019

(30) Foreign Application Priority Data

Oct. 4, 2017  (JP) .................. 2017-194519

(51) Int. Cl.
*G02B 6/38*  (2006.01)
*G02B 6/02*  (2006.01)

(52) U.S. Cl.
CPC ....... *G02B 6/3825* (2013.01); *G02B 6/02395* (2013.01); *G02B 6/387* (2013.01); *G02B 6/3821* (2013.01); *G02B 6/3851* (2013.01); *G02B 6/3854* (2013.01); *G02B 6/3869* (2013.01); *G02B 6/3877* (2013.01); *G02B 6/3885* (2013.01)

(58) Field of Classification Search
None
See application file for complete search history.

(56) References Cited

U.S. PATENT DOCUMENTS

| | | | |
|---|---|---|---|
| 6,318,905 B1 | 11/2001 | Valencia et al. | |
| 6,402,392 B1 * | 6/2002 | Yarita | G02B 6/3851 385/60 |
| 2002/0122634 A1 | 9/2002 | Miyake et al. | |

(Continued)

FOREIGN PATENT DOCUMENTS

JP    H08-094879 A    4/1996

OTHER PUBLICATIONS

Ryo Nagase et al., "MU-type multicore fiber connector," Proceedings of the 61st IWCS Conference, 2012, pp. 823-827.

*Primary Examiner* — Tina M Wong
(74) *Attorney, Agent, or Firm* — Faegre Drinker Biddle & Reath LLP

(57) ABSTRACT

An optical connector includes an optical fiber including a glass fiber and a resin coating surrounding the glass fiber; a ferrule having a flange outside the ferrule and holding, inside the ferrule, a portion of the glass fiber exposed from the resin coating at an end of the optical fiber; a plug frame accommodating the ferrule; and an elastic member abutting the flange and biasing the ferrule forward in an optical axis direction of the optical fiber to retain the ferrule inside the plug frame. The flange and the plug frame have a protrusion and a recess that allow the flange and the plug frame to be fitted to each other at the predetermined position. When the ferrule is moved rearward in the optical axis direction, the protrusion and the recess are released from each other to bring the ferrule into a floating state relative to the plug frame.

10 Claims, 9 Drawing Sheets

(56) References Cited

U.S. PATENT DOCUMENTS

| | | | |
|---|---|---|---|
| 2004/0264877 A1* | 12/2004 | Makhlin | G02B 6/3807 385/78 |
| 2007/0292084 A1* | 12/2007 | Gurreri | G02B 6/3831 385/78 |
| 2008/0069501 A1* | 3/2008 | Mudd | G02B 6/3825 385/75 |
| 2011/0038584 A1* | 2/2011 | Hyakutake | G02B 6/3821 385/78 |
| 2011/0222819 A1* | 9/2011 | Anderson | G02B 6/3825 385/78 |
| 2012/0057831 A1* | 3/2012 | Taira | G02B 6/3849 385/78 |
| 2013/0266279 A1* | 10/2013 | Nishioka | G02B 6/3851 385/99 |
| 2016/0139344 A1* | 5/2016 | de los Santos Campos | G02B 6/3869 385/78 |
| 2016/0231512 A1* | 8/2016 | Seki | G02B 6/3893 |
| 2016/0324402 A1* | 11/2016 | Yajima | G02B 6/3874 |
| 2017/0293090 A1* | 10/2017 | Hopper | G02B 6/3821 |
| 2019/0101704 A1* | 4/2019 | Morishima | G02B 6/3821 |
| 2019/0101705 A1* | 4/2019 | Morishima | G02B 6/381 |

* cited by examiner

OPTICAL CONNECTOR AND OPTICAL CONNECTION STRUCTURE

BACKGROUND OF THE INVENTION

Field of the Invention

The present invention relates to optical connectors and optical connection structures, and specifically to an optical connector and an optical connection structure that include a ferrule with a flange, an elastic member biasing the ferrule, and a plug frame accommodating the ferrule and the elastic member.

Description of the Related Art

With the widespread use of information and communication technologies such as the Internet, the construction of optical networks is progressing to support high-speed communication and increased volumes of information as well as two-way communication and high-volume communication. Optical connectors are used to connect network devices to each other in data centers and to connect optical fibers to premises receiving equipment in subscriber optical communication systems.

An optical connector includes a ferrule holding an optical fiber and a plug frame accommodating the ferrule. A flange is disposed outside the ferrule. The flange is biased in the optical axis direction of the optical fiber. The optical connector is coupled to another optical connector with a sleeve therebetween, and the cores of the optical fibers are optically connected together to form an optical connection structure.

Optical connection structures need to maintain an optical connection between cores when an external force is applied to a plug frame. Accordingly, Ryo Nagase et al., "MU-Type Multicore Fiber Connector", Proceedings of the 61$^{st}$ IWCS Conference (2012) (Non-Patent Literature 1) discloses a structure for allowing a ferrule and a flange to float relative to a plug frame (plug housing) so that an external force applied to the plug frame is not transmitted to the ferrule or the flange.

SUMMARY OF THE INVENTION

An object of the present invention is to provide an optical connector and an optical connection structure that require fewer components and that have a simpler structure.

To achieve the object, there is provided an optical connector including an optical fiber, a ferrule, a plug frame, and an elastic member and configured to connect the optical fiber to another optical fiber at an end of the optical connector. The optical fiber includes a glass fiber and a resin coating surrounding the glass fiber. The ferrule has a flange outside the ferrule and a through-hole inside the ferrule and holds, in the through-hole, a portion of the glass fiber exposed from the resin coating at an end of the optical fiber. The plug frame accommodates the ferrule. The elastic member abuts the flange and biases the ferrule parallel to a central axis of the through-hole toward an end face side of the ferrule where an end face of the optical fiber is exposed. The flange and the plug frame of the optical connector have a protrusion and a recess, respectively, or a recess and a protrusion, respectively, that are configured to fit to each other. The optical connector is configured such that, when the ferrule is moved away from the end of the optical connector, the protrusion and the recess are released from each other to bring the ferrule into a floating state relative to the plug frame.

The flange of the optical connector of the present invention may have the protrusion on an outer peripheral surface of the flange. The plug frame may have the recess in an inner peripheral surface of the plug frame such that the recess guides the protrusion parallel to the central axis of the through-hole and a clearance into which the protrusion does not fit on a side of the recess facing away from the end of the optical connector. In this case, the plug frame may have a tapered surface on a side of the clearance facing the recess such that an inner space is tapered toward the recess. In addition, the recess may become gradually narrower toward the end of the optical connector. The protrusion may become gradually narrower toward the end of the optical connector. Furthermore, the flange may have a tapered surface such that the flange is tapered toward the end of the optical connector. The optical fiber may be a single-mode fiber, a multicore fiber, a polarization-maintaining fiber, or a fiber bundle. The ferrule is preferably formed of zirconia.

According to another aspect of the present invention, there is provided an optical connection structure including the optical connector of the present invention and a connection target coupled to the optical connector of the present invention with a sleeve therebetween. The two optical fibers are optically connected together. The protrusion and the recess are released from each other and the ferrule is in the floating state relative to the plug flame when the ferrule is inserted into the sleeve and is moved rearward in an optical axis direction relative to a predetermined position of the plug frame.

The optical connector and the optical connection structure of the present invention require fewer components and have a simpler structure.

DESCRIPTION OF THE PREFERRED EMBODIMENTS

Preferred embodiments of optical connectors and optical connection structures according to the present invention will now be described with reference to the attached drawings.

The structure in Non-Patent Literature 1 has a coupling component (Oldham coupling mechanism) between the flange and the plug frame. The ferrule is movable relative to the coupling component in a first direction perpendicular to the central axis of the ferrule. The coupling component is movable relative to the plug frame in a second direction perpendicular to both the central axis of the ferrule and the first direction. In this structure, the flange is divided into a plurality of segments movable in the first and second directions; therefore, the optical connector requires an increased number of components and has a complicated structure, which makes it difficult to reduce the manufacturing cost of the optical connector. In addition, Non-Patent Literature 1 only discloses that the ferrule is allowed to float within the plug frame so that the ferrule is movable in a direction perpendicular to the central axis of the ferrule; it does not disclose that the ferrule is allowed to float so that the ferrule is also movable in the direction of the central axis of the ferrule and is also rotatable.

Figure 1:
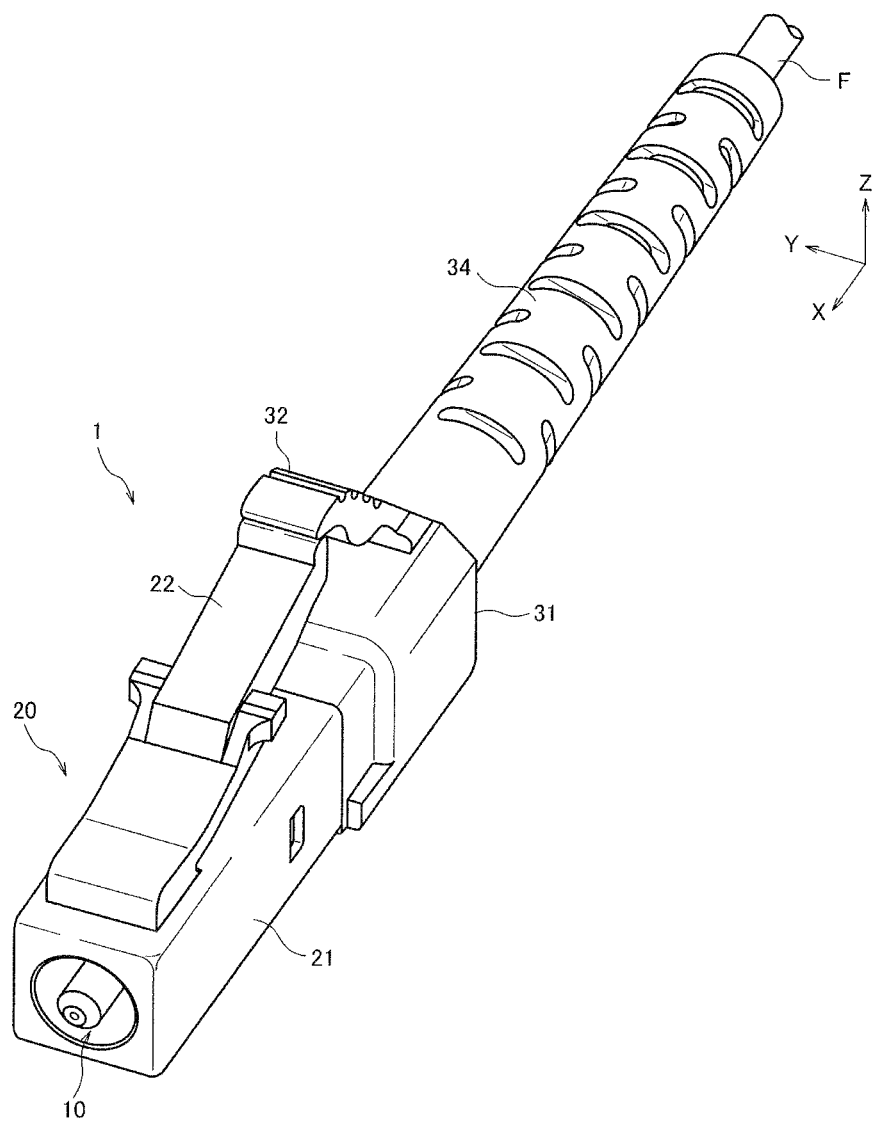
FIG. 1 is an external perspective view of an optical connector according to an embodiment of the present invention.

FIG. 1 is an external perspective view of an optical connector 1 according to an embodiment of the present invention. The optical connector 1 includes a plug frame 20 accommodating a ferrule 10. A boot 34 for protecting an optical fiber F is disposed at the rear end of the plug frame 20.

Figure 2:
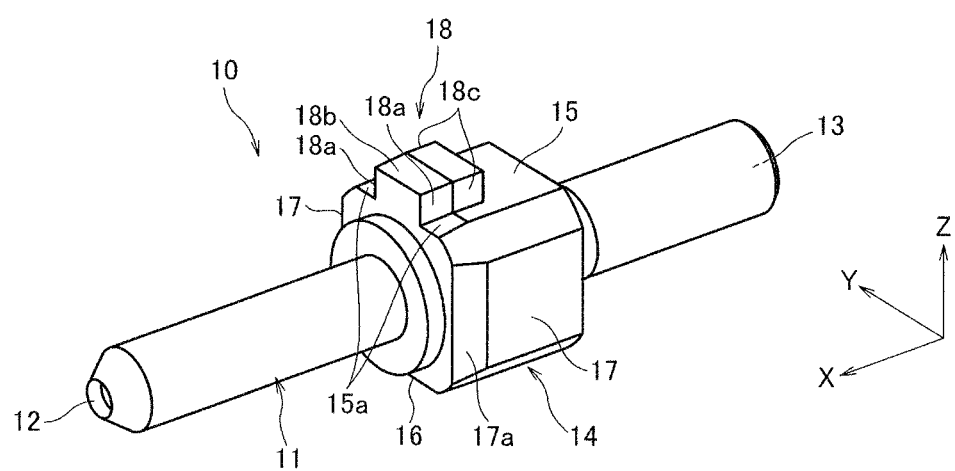
FIG. 2 is a perspective view of a ferrule included in the optical connector in FIG. 1.

FIG. 2 is a perspective view of the ferrule 10 included in the optical connector 1. The ferrule 10 includes a ferrule body 11 extending in the X-axis direction shown in the figure. The ferrule body 11 is formed of zirconia. The ferrule body 11 is cylindrical and holds therein a portion of a glass fiber exposed from a resin coating at the distal end of the optical fiber F. The optical fiber F is, for example, a multicore fiber having multiple cores. The optical fiber F is attached to the ferrule 10 by inserting the optical fiber F into the rear end 13 of the ferrule body 11 and exposing the distal end face of the optical fiber F at the front end 12 of the ferrule body 11 such that the multiple cores are located at predetermined positions around the central axis of the ferrule 10. The X-axis direction shown in the figure corresponds to the optical axis direction of the optical fiber F. A zirconia ferrule reflects less light at the end face thereof than a metal ferrule.

A flange 14 is disposed at a substantially central position outside the ferrule body 11. The flange 14 has a substantially quadrangular cross-section and has a top surface 15, a bottom surface 16, and side surfaces 17 forming the outer peripheral surface of the flange 14. The top surface 15 and the bottom surface 16 are flat surfaces parallel to each other at a predetermined distance in the Z-axis direction shown in the figure. The side surfaces 17 are flat surfaces parallel to each other at a predetermined distance in the Y-axis direction shown in the figure. The flange 14 also has tapered surfaces 15a in the top surface 15 thereof and tapered surfaces 17a in the side surfaces 17 thereof such that the flange 14 is tapered in the positive direction of the X-axis shown in the figure. The flange 14 becomes gradually thinner along the tapered surfaces 15a and becomes gradually narrower along the tapered surfaces 17a. Although not visible in FIG. 2, the flange 14 also has similar tapered surfaces in the bottom surface 16 thereof. The tapered surfaces 15a and 17a facilitate insertion of the ferrule 10 from the rear side of the plug frame 20. As the ferrule 10 advances further, the gap between the flange 14 and the plug frame 20 becomes smaller, which facilitates alignment of the ferrule 10 to the plug frame 20.

The flange 14 has a key 18 on the top surface 15 thereof, for example, near the front end thereof. The key 18 protrudes outward in the radial direction of the ferrule 10 (e.g., in the positive direction of the Z-axis shown in the figure). The key 18 has a substantially quadrangular cross-section, as does the flange 14, and has key side surfaces 18c parallel to each other at a predetermined distance in the Y-axis direction shown in the figure. The key 18 corresponds to the protrusion of the present invention. The key 18 also has tapered surfaces 18a and 18b near the front end thereof such that the key 18 is tapered in the positive direction of the X-axis shown in the figure. The key 18 becomes gradually narrower along the tapered surfaces 18a and becomes gradually thinner along the tapered surface 18b. The ferrule 10 with the flange 14 is accommodated in the plug frame 20.

Figure 3:
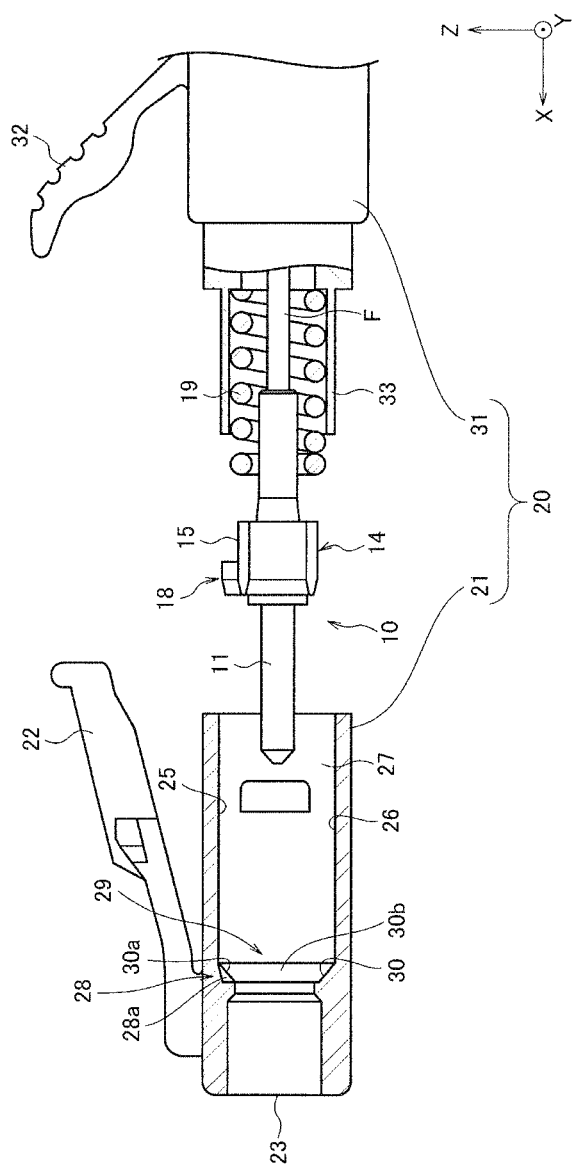
FIG. 3 is a partial sectional view showing the optical connector in FIG. 1 before the accommodation of the ferrule into a plug frame.

FIG. 3 is a sectional view showing the optical connector 1 before the accommodation of the ferrule 10 into the plug frame 20. The plug frame 20 has a quadrangular tubular front housing 21 on the front side thereof (on the side where the ferrule 10 is exposed from the plug frame 20 in the X-axis direction shown in the figure) and a rear housing 31 on the rear side thereof. The front housing 21 accommodates the distal portion of the ferrule 10. The rear housing 31 accommodates the rear portion of the ferrule 10 and a coil spring 19.

Figure 4:
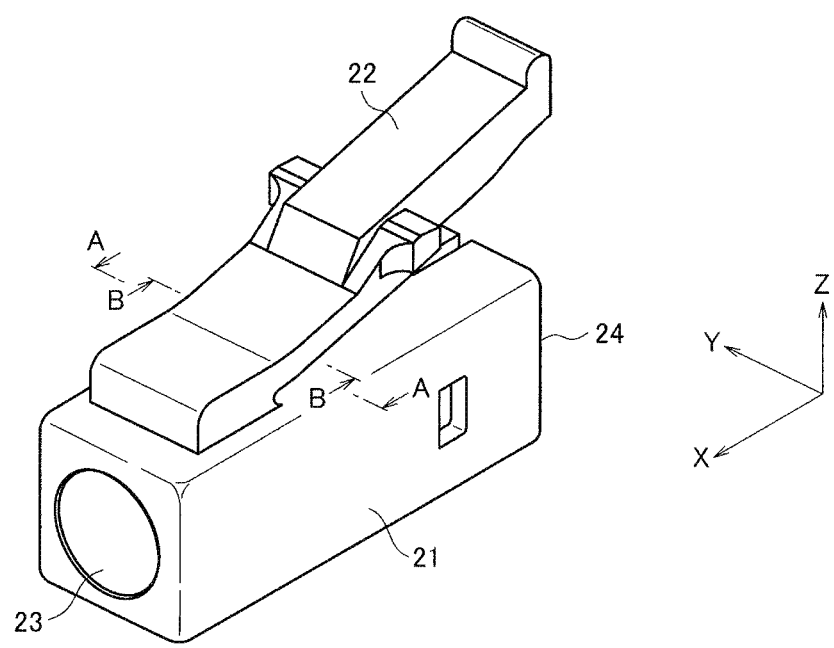
FIG. 4 is a perspective view of a front housing of the optical connector in FIG. 1.

FIG. 4 is a perspective view of the front housing 21. The front housing 21 is formed of resin. The front housing 21 has a rear end opening 24 having a square shape and capable of receiving the ferrule 10 with the flange 14 and a front end opening 23 from which the front end 12 of the ferrule body 11 protrudes. A flexible latch arm 22 is disposed on the outer peripheral surface of the front housing 21.

Figure 5A:
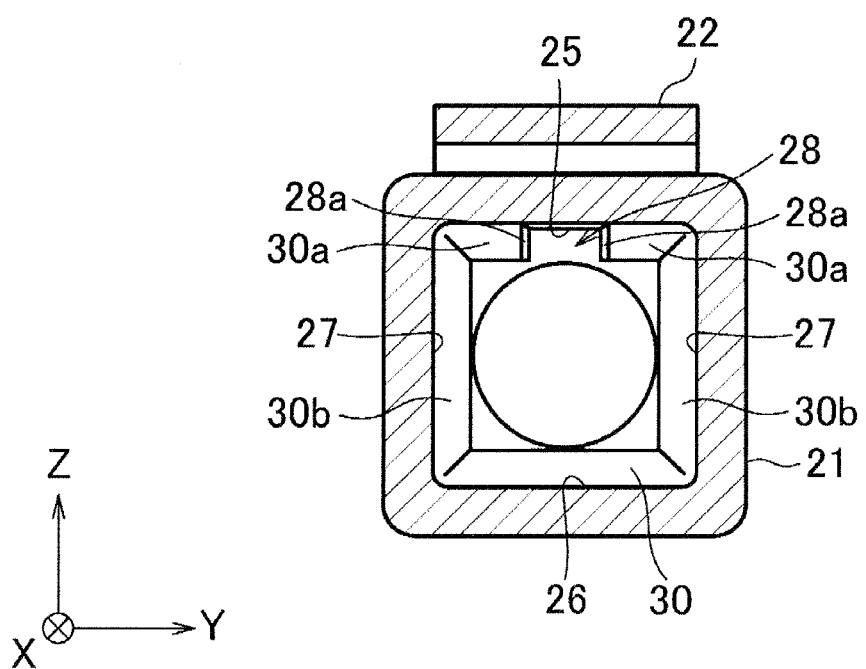
FIG. 5A is a sectional view of the front housing as viewed in the direction of the arrows A-A in FIG. 4.
Figure 5B:
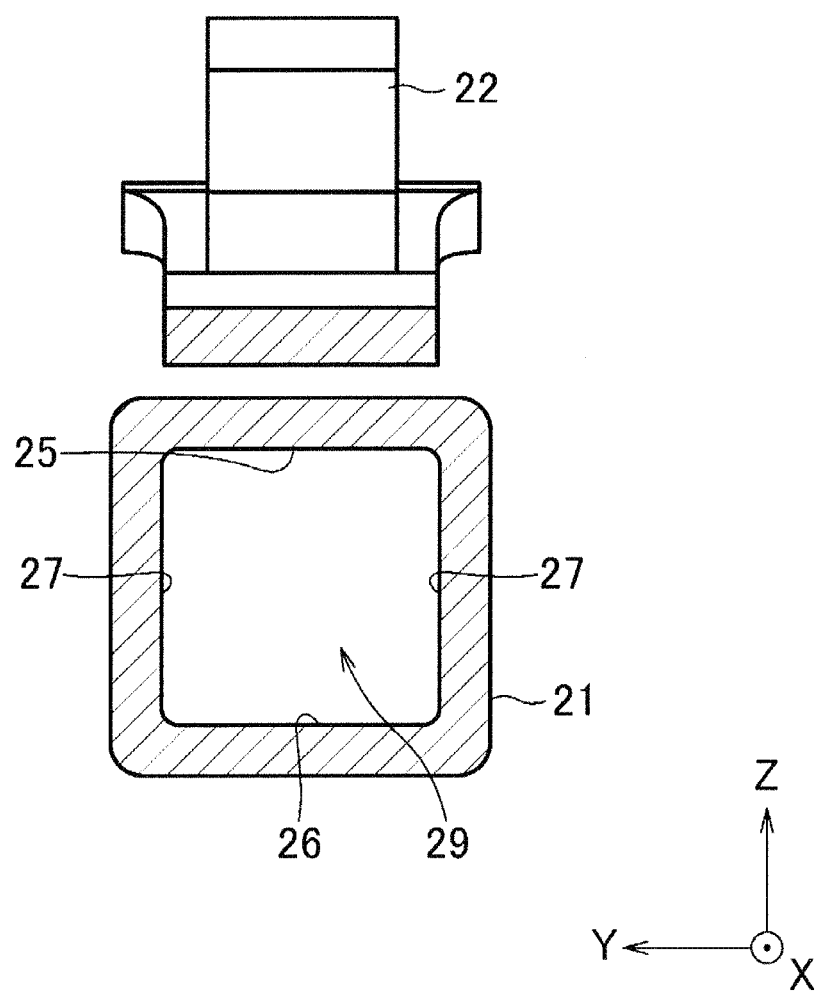
FIG. 5B is a sectional view of the front housing as viewed in the direction of the arrows B-B in FIG. 4.

FIG. 5A is a sectional view of the front housing 21 as viewed in the direction of the arrows A-A in FIG. 4, and FIG. 5B is a sectional view of the front housing 21 as viewed in the direction of the arrows B-B in FIG. 4. The front housing 21 has a top surface 25, a bottom surface 26, and side surfaces 27 inside the front housing 21. The top surface 25 and the bottom surface 26 are parallel to each other at a predetermined distance in the Z-axis direction shown in the figures. The side surfaces 27 are parallel to each other at a predetermined distance in the Y-axis direction shown in the figures. There is a keyway 28 in the top surface 25. The keyway 28 corresponds to the recess of the present invention.

Specifically, the keyway 28 is recessed in the positive direction of the Z-axis shown in the figure. The keyway 28 has guide surfaces 28a that face the key side surfaces 18c (FIG. 2) and is configured to guide the key 18 in the X-axis direction shown in the figure. The width between the guide surfaces 28a becomes gradually smaller in the positive direction of the X-axis, and the keyway 28 also becomes gradually shallower in the positive direction of the X-axis. Since the key 18 becomes gradually thinner in the positive direction of the X-axis, the key 18 fits more tightly into the keyway 28 as the flange 14 advances, which allows the ferrule 10 to be reliably aligned to the front housing 21.

The front housing 21 also has tapered surfaces 30a in the top surface 25 thereof, a tapered surface 30 in the bottom surface 26 thereof, and tapered surfaces 30b in the side surfaces 27 thereof such that the inner space is tapered in the positive direction of the X-axis shown in the figure. The tapered surface 30 is first described by way of example. The distance between the top surface 25 and the bottom surface 26 on the opening 23 side (the front side) of the keyway 28 is shorter than the distance between the top surface 25 and the bottom surface 26 on the opening 24 side (the rear side) of the keyway 28, and they are joined together by the tapered surface 30, which rises gradually in the positive direction of the X-axis shown in the figure. The tapered surfaces 30b are described next by way of example. The width between the side surfaces 27 on the front side of the keyway 28 is shorter than the width between the side surfaces 27 on the rear side of the keyway 28.

In this way, the height and width of the inner space of the front housing 21 of the plug frame 20 become gradually shorter in the forward direction, which facilitates insertion of the ferrule 10 from the rear side of the front housing 21. As the ferrule 10 advances further, the gap between the outer peripheral surface of the flange 14 and the inner peripheral surface of the front housing 21 becomes smaller, which facilitates alignment of the ferrule 10 to the front housing 21.

On the other hand, there is no keyway 28 in the portion of the top surface 25 shown in FIG. 5B. As shown in FIG. 3, there is a clearance 29 into which the key 18 does not fit on the rear side of the keyway 28 (in the negative direction of the X-axis shown in the figure; the same applies hereinafter). Specifically, the clearance 29 is a quadrangular tubular inner space defined by the top surface 25, the bottom surface 26, and the side surfaces 27. The distance between the top surface 25 and the bottom surface 26 (the length in the Z-axis direction shown in the figure; the same applies hereinafter) is longer than the thickness of the flange 14 including the key 18. The ferrule 10 with the flange 14 is allowed to float when the flange 14 is located at the clearance 29. By providing the keyway 28 and the clearance 29, an aligned state and a floating state can be easily achieved.

The rear housing 31 is formed of, for example, resin. As shown in FIG. 3, the rear housing 31 has a cylindrical spring-accommodating part 33 capable of accommodating the rear portion of the ferrule 10 and the coil spring 19. The coil spring 19 is disposed on the rear side of the ferrule 10 and is brought into abutment with the rear end of the flange 14 to bias the ferrule 10 forward (in the positive direction of the X-axis shown in the figure; the same applies hereinafter). The coil spring 19 corresponds to the elastic member of the present invention.

A clip 32 capable of engaging with the latch arm 22 is disposed on the outer peripheral surface of the rear housing 31. The rear portion of the ferrule 10 and the coil spring 19 are accommodated into the rear housing 31, whereas the distal portion of the ferrule 10 is inserted into the front housing 21. At this time, the flange 14 is placed on the bottom surface 26 of the front housing 21 when located at the clearance 29.

Figure 6:
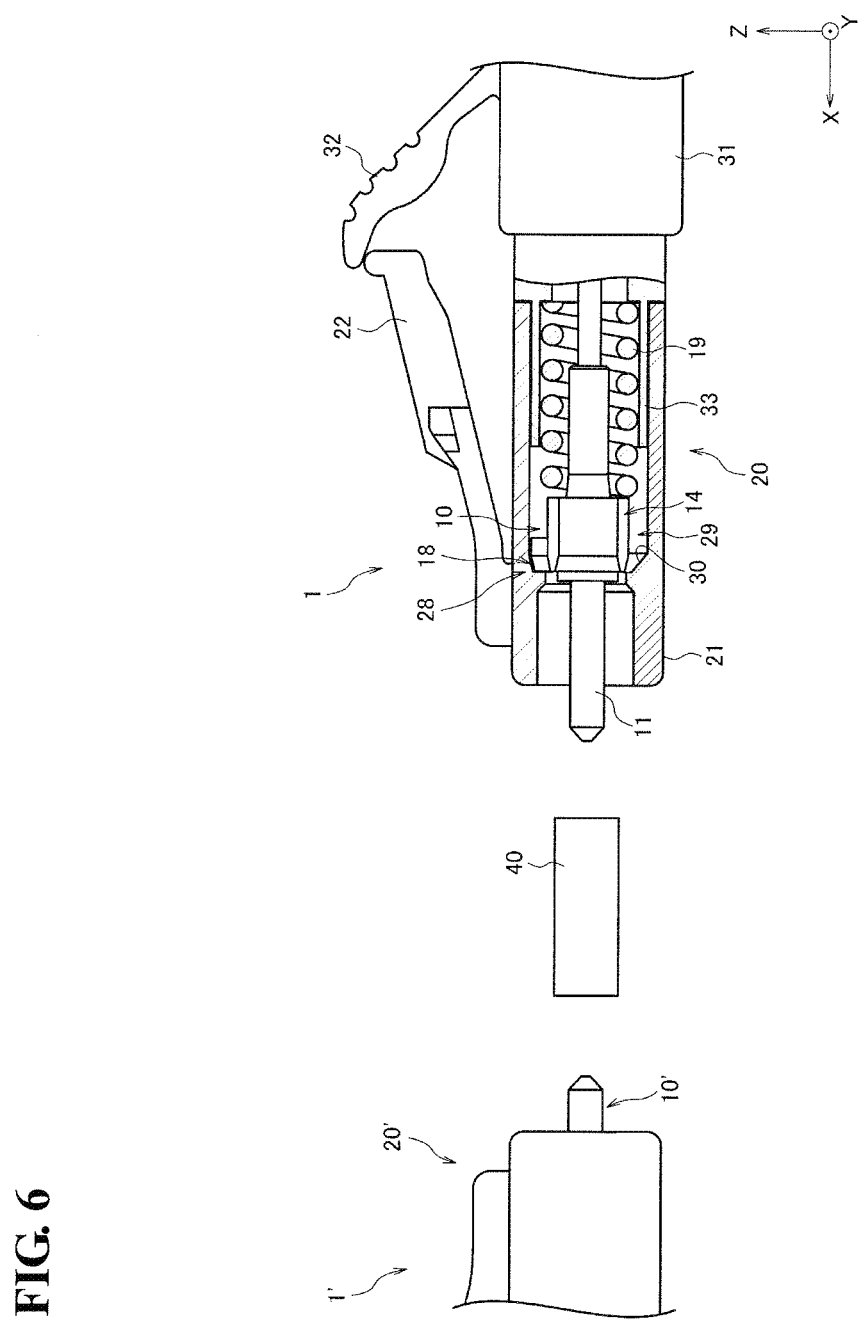
FIG. 6 is a partial sectional view showing the optical connector in FIG. 1 as it opposes another optical connector with a split sleeve therebetween.

FIG. 6 is a sectional view showing the optical connector 1 in FIG. 1 as it opposes another optical connector 1' with a split sleeve 40 therebetween. As the clip 32 moves onto the latch arm 22, the front housing 21 is latched to the rear housing 31. At the same time, the flange 14 is pushed forward by the biasing force of the coil spring 19 and is quickly moved forward along the tapered surfaces 30, 30a, and 30b of the front housing 21. When the flange 14 reaches the tapered surfaces 30, 30a, and 30b, the key 18 of the flange 14 starts fitting into the keyway 28 of the front housing 21.

The tapered surfaces 18a and 18b of the key 18 enter the keyway 28. As the ferrule 10 advances further, the key side surfaces 18c of the key 18 come into tight contact with the guide surfaces 28a of the keyway 28. When the flange 14 and the front housing 21 are fitted to each other, the ferrule 10 is aligned at a position where the ferrule 10 has its distal portion protruding from the front housing 21. In this state, the ferrule 10 is difficult to move in any of the X-axis, Y-axis, and Z-axis directions and is also difficult to rotate about the optical axis.

Figure 7:
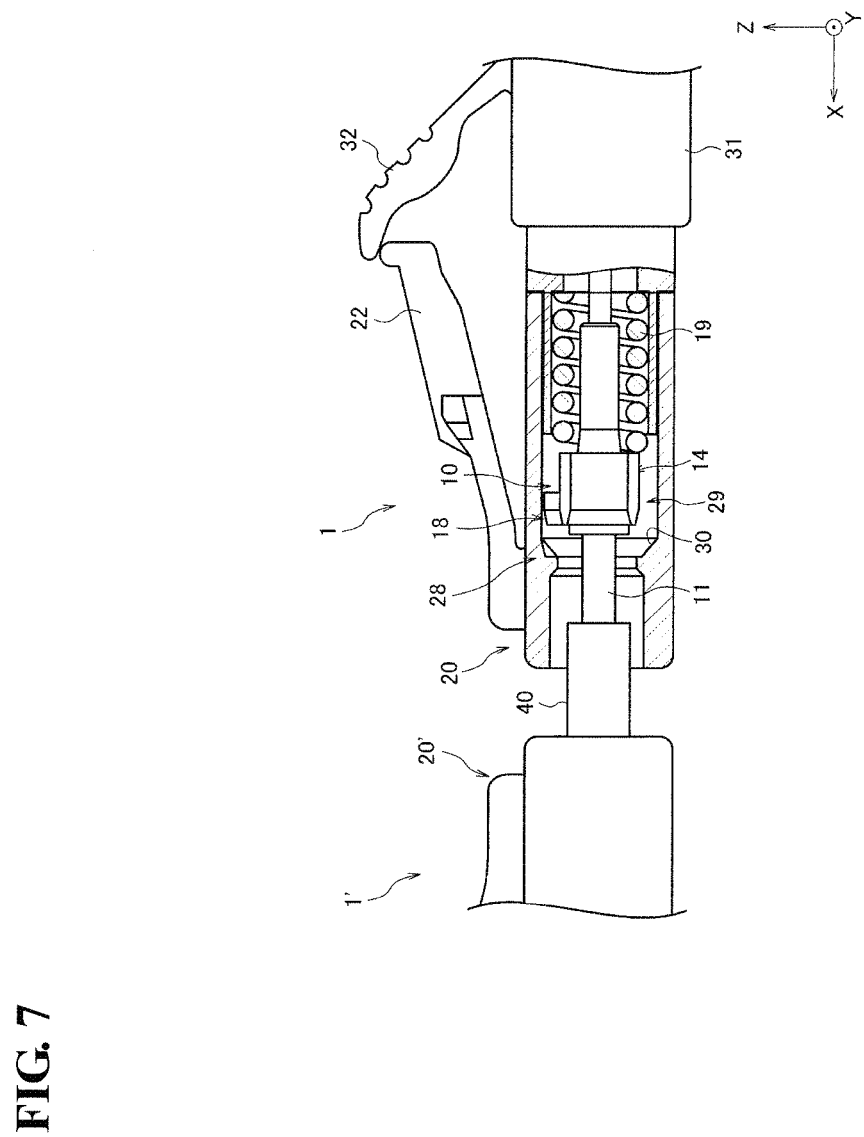
FIG. 7 is a partial sectional view showing the optical connector in FIG. 1 as it is connected to the other optical connector with the split sleeve therebetween.

FIG. 7 is a partial sectional view of an embodiment of an optical connection structure of the present invention in which the optical connector 1 is connected to the other optical connector 1' with the split sleeve 40 therebetween. The optical connection structure includes the optical connector 1 and the other optical connector P. The split sleeve 40 (the sleeve of the present invention) is used to optically connect the optical fiber F on the optical connector 1 side to an optical fiber F' (not shown) on the optical connector 1' side. The optical fiber F' is a multicore fiber having multiple cores. The optical fiber F' is attached to a ferrule 10' such that the multiple cores are located at predetermined positions around the central axis of the ferrule 10'.

Although not shown in cross-section, the optical connector 1' is configured in the same manner as the optical connector 1 and includes a plug frame 20' accommodating the ferrule 10' holding the optical fiber F' and an elastic member (not shown) biasing the ferrule 10'. The optical connector 1', which corresponds to the connection target of the present invention, may be replaced by an optical plug.

The split sleeve 40 has an inner diameter substantially equal to, or slightly smaller than, the diameter of the ferrules 10 and 10'. The split sleeve 40 has a slit (not shown) that can be widened to increase the inner diameter thereof. The split sleeve 40 may be incorporated into an adaptor (not shown).

The ferrule 10 is inserted into one end of the split sleeve 40, whereas the ferrule 10' is inserted into the other end of the split sleeve 40. The end face of the optical fiber F on the ferrule 10 side and the end face of the optical fiber F' on the ferrule 10' side are brought into surface contact with each other in the split sleeve 40. As the split sleeve 40 enters the front housing 21 and the ferrule 10 is moved rearward, the flange 14 is moved rearward against the biasing force of the coil spring 19, with the result that the key 18 is released from the keyway 28. When the flange 14 is moved to the clearance 29, the ferrule 10 is brought into a floating state relative to the front housing 21. In this state, the ferrule 10 is movable in any of the X-axis, Y-axis, and Z-axis directions and is also rotatable about the optical axis together with the optical fiber F' on the optical connector 1' side.

In this way, the key 18 of the flange 14 is fitted in the keyway 28 of the front housing 21 until the optical connector 1 is coupled to the optical connector 1' (until the ferrule 10 is moved from the front side to the rear side), which allows the ferrule 10 to be aligned to the front housing 21 and also prevents rotation. Thus, when the plug frame 20 is opposed to the plug frame 20', the multiple cores included in the optical fiber F can be accurately opposed to the multiple cores included in the optical fiber F'.

On the other hand, after the optical connector 1 is coupled to the optical connector 1' (after the ferrule 10 is moved to the rear side, i.e., when the connectors 1 and 1' are connected together), the key 18 is released from the keyway 28 to allow the ferrule 10 to float relative to the front housing 21. When an external force is applied to the front housing 21 or the rear housing 31, the external force is not transmitted to the ferrule 10, so that the optical connection between the two optical fibers F and F' can be maintained.

In this way, an aligned state and a floating state are achieved simply by providing the key 18 and the keyway 28. Thus, the optical connector 1 requires fewer components and has a simpler structure. As a result, an optical connection structure in which an optical connection can be easily maintained with a simple structure can be provided.

Although an example in which the flange 14 has the key 18 and the front housing 21 has the keyway 28 has been described in the foregoing embodiment, the present invention is not limited to this example; instead, the flange may have the keyway, and the front housing may have the key. Although LC connectors have been described as examples of optical connectors in the foregoing embodiment, the present invention can also be applied to other types of optical connectors, including, for example, SC connectors and MU connectors.

Furthermore, although a multicore fiber has been described as an example of the optical fiber F, the optical fiber of the present invention may also be, for example, a single-mode fiber, a polarization-maintaining fiber, or a fiber bundle. Multicore fibers, polarization-maintaining fibers, and fiber bundles are optical fibers that require the adjustment of the angle of rotation about the central axis when optically connected.

Although not shown, a polarization-maintaining fiber (e.g., a stress-induced polarization-maintaining fiber) has circular stress-inducing parts disposed on both sides of a core. Whereas a single-mode fiber has two modes with orthogonal planes of polarization (polarization modes), a polarization-maintaining fiber creates a difference in propagation constant between these two polarization modes to reduce the coupling of one polarization mode to the other polarization mode, thereby achieving an enhanced polarization-maintaining ability.

Figure 8:
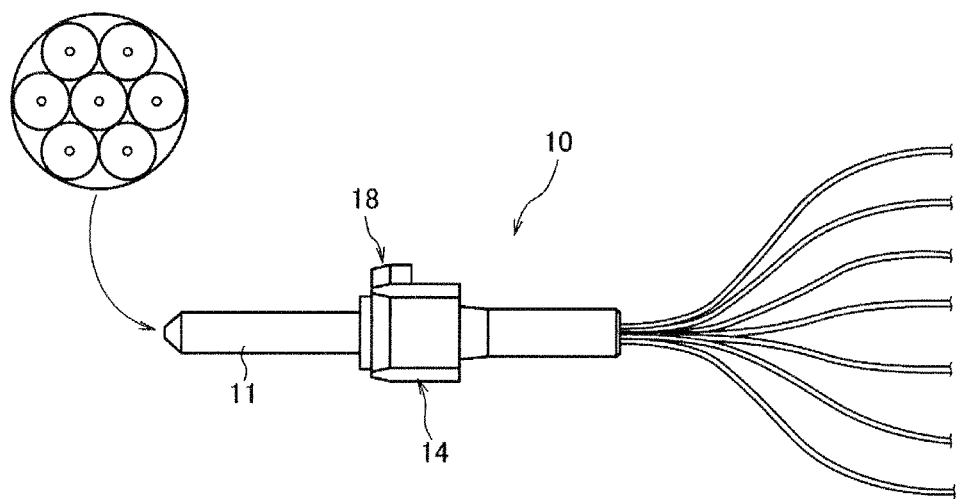
FIG. 8 is a conceptual diagram illustrating a fiber bundle.

A fiber bundle is a bundle of single-core fibers for optical connection to a multicore fiber. Specifically, for example, ends of single-core fibers with a glass diameter of 125 μm are chemically etched to a glass diameter of 45 μm. As shown in FIG. 8, a plurality of (e.g., seven) fibers are inserted together into the ferrule 10 with an adhesive. In this example, the fibers can be arranged such that the core-to-core distance is 45 μm. In this way, it is possible to reliably align not only single-mode fibers, but also multicore fibers, polarization-maintaining fibers, and fiber bundles, thereby achieving a reduction in connection loss.

The embodiments disclosed herein are to be considered in all respects as illustrative and not restrictive. The scope of the invention is indicated by the claims, rather than by the foregoing meaning, and all changes that come within the meaning and range of equivalency of the claims are intended to be embraced therein.

What is claimed is:

1. An optical connector comprising:
   an optical fiber comprising a glass fiber and a resin coating surrounding the glass fiber;
   a ferrule having a front end and a rear end, the ferrule having a flange outside the ferrule and between the front end and rear end of the ferrule, and the ferrule having a through-hole inside the ferrule, the ferrule holding, in the through-hole, a portion of the glass fiber exposed from the resin coating at an end of the optical fiber;
   a plug frame accommodating the ferrule; and
   an elastic member abutting the flange and biasing the ferrule parallel to a central axis of the through-hole toward an end face side of the ferrule where an end face of the optical fiber is exposed,
   the optical connector being configured to connect the optical fiber to another optical fiber at an end of the optical connector,
   wherein the flange and the plug frame have a protrusion and a recess, respectively, or a recess and a protrusion, respectively, that are configured to fit to each other,
   wherein, when the ferrule is moved away from the end of the optical connector, the protrusion and the recess are released from each other to bring the ferrule into a floating state relative to the plug frame, and
   wherein, in the floating state, the ferrule is accommodated in the plug frame and the front end and the rear end of the ferrule and the flange of the ferrule are movable relative to one another in both axial and rotational directions.

2. The optical connector according to claim 1,
   wherein the flange has the protrusion on an outer peripheral surface of the flange, and the plug frame has the recess in an inner peripheral surface of the plug frame such that the recess guides the protrusion parallel to the central axis of the through-hole and a clearance into which the protrusion does not fit on a side of the recess facing away from the end of the optical connector.

3. The optical connector according to claim 2,
   wherein the plug frame has a tapered surface on a side of the clearance facing the recess such that an inner space is tapered toward the recess.

4. The optical connector according to claim 1,
   wherein the recess becomes gradually narrower toward the end of the optical connector.

5. The optical connector according to claim 1,
   wherein the flange has a tapered surface such that the flange is tapered toward the end of the optical connector.

6. The optical connector according to claim 1,
   wherein the protrusion becomes gradually narrower toward the end of the optical connector.

7. The optical connector according to claim 1,
   wherein the optical fiber is a single-mode fiber, a multicore fiber, a polarization-maintaining fiber, or a fiber bundle.

8. The optical connector according to claim 1,
   wherein the ferrule
   comprises zirconia.

9. An optical connection structure comprising:
   the optical connector according to claim 1; and
   a connection target coupled to the optical connector with a sleeve therebetween, wherein the two optical fibers are optically connected together, and
   wherein the protrusion and the recess are released from each other and the ferrule is in the floating state relative to the plug flame.

10. The optical connector according to claim 1, wherein, in the floating state, an end face of the optical fiber on the end face side of the ferrule contacts an end face of another optical fiber.

* * * * *